(12) United States Patent
McCall et al.

(10) Patent No.: US 9,087,052 B2
(45) Date of Patent: Jul. 21, 2015

(54) BATCH DBMS STATEMENT PROCESSING SUCH THAT INTERMEDIATE FEEDBACK IS PROVIDED PRIOR TO COMPLETION OF PROCESSING

(75) Inventors: Eric Kenneth McCall, Peterborough, NH (US); Mingsheng Hong, Somerville, MA (US); Rajat Venkatesh, Billerica, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 246 days.

(21) Appl. No.: 13/459,256

(22) Filed: Apr. 30, 2012

(65) Prior Publication Data
US 2013/0110800 A1   May 2, 2013

Related U.S. Application Data

(60) Provisional application No. 61/554,852, filed on Nov. 2, 2011.

(51) Int. Cl.
*G06F 17/30* (2006.01)
*G06F 7/00* (2006.01)

(52) U.S. Cl.
CPC .......... *G06F 17/30* (2013.01); *G06F 17/30424* (2013.01); *G06F 17/30445* (2013.01); *G06F 17/30463* (2013.01); *G06F 17/30979* (2013.01)

(58) Field of Classification Search
None
See application file for complete search history.

(56) References Cited

U.S. PATENT DOCUMENTS

| | | | |
|---|---|---|---|
| 6,651,142 B1 * | 11/2003 | Gorelik et al. ............... | 711/119 |
| 6,757,670 B1 * | 6/2004 | Inohara et al. ................ | 1/1 |
| 7,580,920 B2 | 8/2009 | Freedman et al. | |
| 7,921,033 B2 * | 4/2011 | Huang et al. ................. | 705/12 |
| 2005/0192991 A1 * | 9/2005 | Nomoto et al. ............... | 707/101 |
| 2009/0024997 A1 * | 1/2009 | Kobayashi .................... | 718/101 |
| 2009/0108080 A1 * | 4/2009 | Meyer et al. ................. | 235/494 |
| 2010/0293209 A1 | 11/2010 | Bireley et al. | |
| 2010/0325142 A1 * | 12/2010 | Anzalone et al. ............. | 707/769 |
| 2011/0040746 A1 * | 2/2011 | Handa et al. ................. | 707/721 |
| 2011/0099155 A1 * | 4/2011 | Shau et al. ................... | 707/693 |
| 2011/0125778 A1 * | 5/2011 | Kubo ............................ | 707/769 |

OTHER PUBLICATIONS

"Batch Statement Execution Performance," published at http://community.actian.com, dated Nov. 10, 2010, pp. 1-6.

* cited by examiner

*Primary Examiner* — Dung K Chau

(57) ABSTRACT

A database management system (DBMS) client calls an interface of a DBMS server to execute a statement that has been prepared to be executed in batch form in relation to a database managed by the DBMS server. The DBMS client provides a different batch of data to the DBMS server each time the DBMS client calls the interface. The DBMS server processes the different batch of data in accordance with the statement that has been prepared, to effectuate execution of the statement at the DBMS server on a batch basis in relation to the different batch of data. The DBMS server returns results of processing the different batch of data to the DBMS client, such that the DBMS client receives intermediate feedback as to status of processing the statement prior to the statement being completely processed.

13 Claims, 2 Drawing Sheets

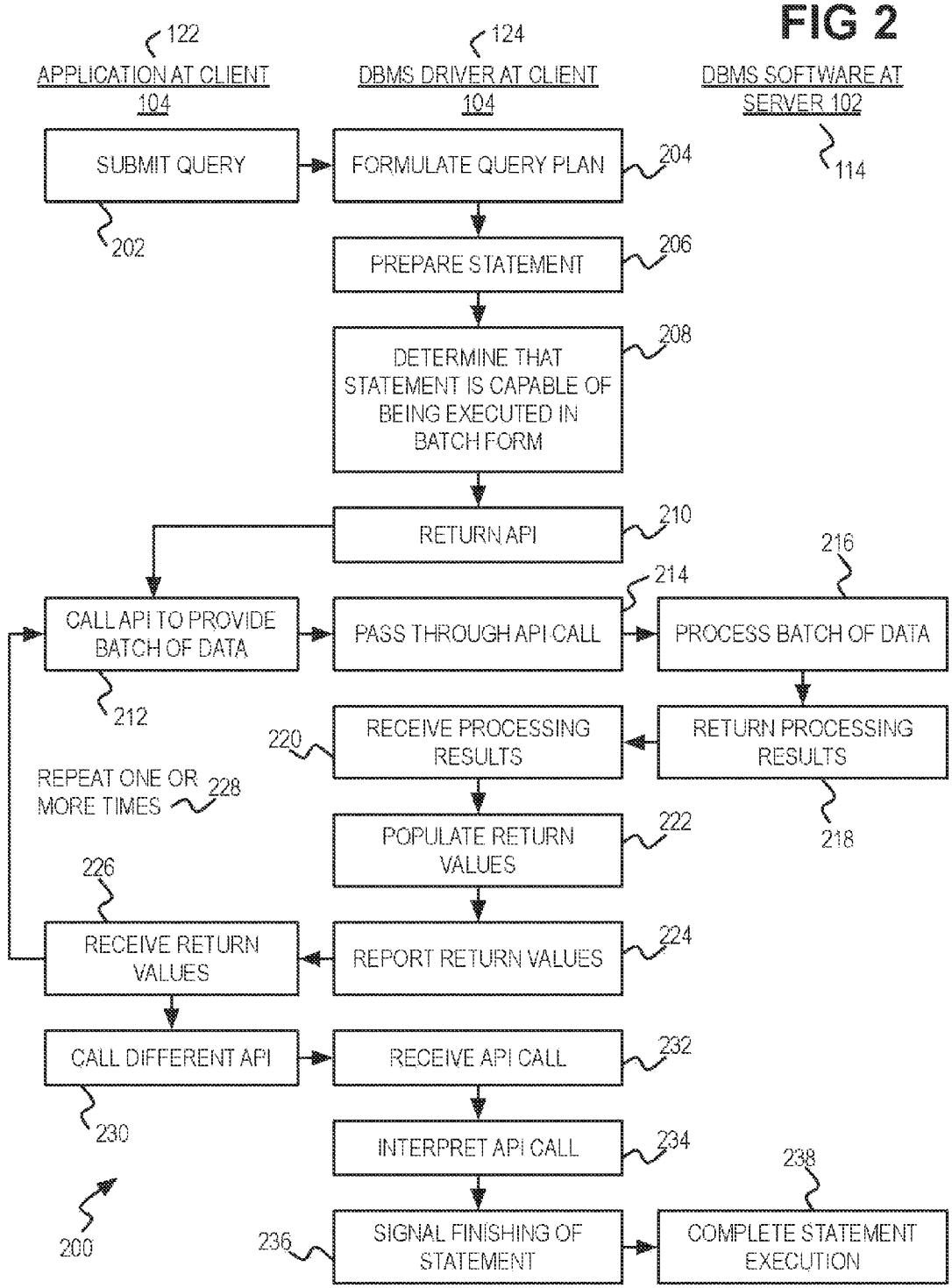

BATCH DBMS STATEMENT PROCESSING SUCH THAT INTERMEDIATE FEEDBACK IS PROVIDED PRIOR TO COMPLETION OF PROCESSING

CROSS-REFERENCE TO RELATED APPLICATION

This application claims the benefit of U.S. Provisional Application No. 61/554,852, filed Nov. 2, 2011.

BACKGROUND

A database is an organized collection of data for one or more purposes, in digital form. The usage and maintenance of a database is achieved through a database management system (DBMS). A DBMS can include hardware devices like server devices that maintain the database and client devices that access the database through the server devices. Software running on the clients, for instance, can interact with software running on the servers through a network to permit the clients to access the database maintained by the servers.

BRIEF DESCRIPTION OF THE DRAWINGS

FIG. 2 is a flowchart of an example method in which a DBMS statement is processed in a batch manner such that intermediate feedback is provided prior to completion of the processing.

DETAILED DESCRIPTION

Figure 1:
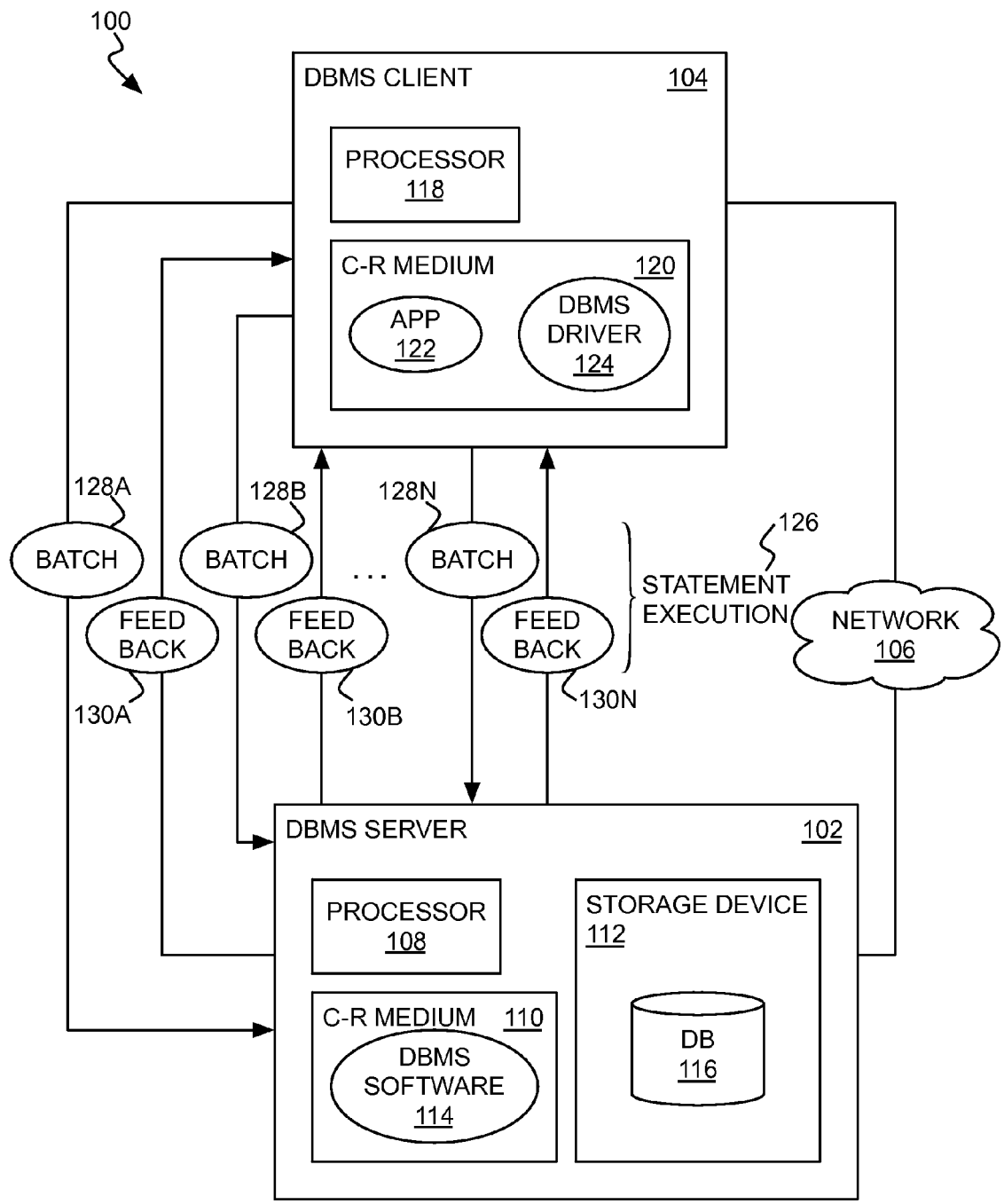
FIG. 1 is a diagram of an example database management system (DBMS).

As noted in the background section, in a database management system (DBMS), a DBMS client can interact with a DBMS server to access a database maintained by the DBMS server. Such access is typically achieved by the DBMS server exposing application programming interfaces (APIs), which the DBMS client calls to access the database. A query to access the database is formulated and planned, and a statement is executed to effectuate the query.

Some types of queries can result in the same statement being performed multiple times. For instance, an INSERT statement can cause a number of database records to be added or updated in accordance with a set of corresponding integers. When the DBMS client calls the appropriate API of the DBMS server, the DBMS server executes the statement once for each integer of the array. After each time the DBMS server executes the statement, it may return processing results to the DBMS client, so that the DBMS client remains informed as to the status of the execution. By calling appropriate API functions, a DBMS client may divide very large sets of records into a number of batches, and receive feedback about the records as each batch of statements is executed.

This type of statement execution can be inefficient from a performance perspective, however. One approach for improving performance of such queries is to execute each array as a single statement. Because statement execution spans records or even batches, performance typically improves.

However, existing batch statement processing usually provides less feedback to the DBMS client as to the status of statement execution. In the prior example, the DBMS server does not provide processing results to the DBMS client until the statement has been executed as to the entire set of integers. As such, even if there may be problems with processing the first batch of data, the DBMS client does not learn of these problems until after it has provided the last batch of data to the DBMS server, which can result in inefficiencies.

One way to mitigate such inefficiencies is to utilize non-standard and proprietary APIs at the DBMS server that the DBMS client can call to obtain status information regarding the processing of the statement in relation to the data that has been thus far provided. However, such an approach may be problematic for at least two reasons. First, it can mean that software at the DBMS client has to be updated to take advantage of such APIs. Second, it places the onus for obtaining status information at the DBMS client, instead of the DBMS server providing such feedback to the client.

Techniques disclosed herein may alleviate these and other shortcomings associated with DBMSs. A DBMS client calls an interface of a DBMS server, which may be a standard API, to execute a statement that has been prepared to be executed in batch form in relation to a database managed by the DBMS server. Each time the DBMS client calls the interface, it provides a different batch of data to the DBMS server. The DBMS server processes the different batch of data in accordance with the statement that has been prepared, to effectuate execution of the statement at the DBMS server on a batch basis in relation to this batch of data.

After processing the batch of data, the DBMS server returns results of this processing back to the DBMS client. As such, the DBMS client receives intermediate feedback as to the status of processing the statement before the statement is completely processed. That is, the DBMS client receives feedback for each batch of data provided to and processed by the DBMS server, and not just after the last batch of data has been provided as with conventional batch processing techniques. However, the performance advantages of batch processing are still present, insofar as the statement can be executed just once for each set or batch of data, and not for each record within each batch.

FIG. 1 shows an example DBMS 100. The DBMS 100 includes at least one DBMS server 102 and at least one DBMS client 104 communicatively connected to one another over a network 106. The DBMS server 102 and the DBMS client 104 are each implemented as one or more computing devices like computers. The DBMS server 102 includes at least a processor 108, a computer-readable medium 110, and a storage device 112. Similarly, the DBMS client 104 includes at least a processor 118 and a computer-readable medium 120. The DBMS server 102 and the DBMS client 104 typically include other hardware as well.

The computer-readable media 110 and 120 can be or include volatile as well as non-volatile media, such as magnetic media, semiconductor media, and the like. The computer-readable medium 110 of the DBMS server 102 may be or include the storage device 112 as well. The storage device 112 may be a magnetic medium, like one or more hard disk drives. The computer-readable medium 110 of the DBMS server 102 stores DBMS software 114 that the processor 108 executes from the medium 110. The storage device 112 stores a database 116 that the DBMS software 114 manages.

The computer-readable medium 120 of the DBMS client 104 stores an application program 122 and a DBMS driver 124 that the processor 118 executes from the medium 120. The application program 122 accesses the database 116 through the DBMS driver 124. The DBMS driver 124 thus fields requests from the application program 122, and interacts with the DBMS software 114 on the DBMS server 102 to access the database 116. Similarly, the DBMS driver 124 receives responses from the DBMS software 114 pertaining to the database 116, and processes and transmits the responses for and to the application program 122.

In operation, in accordance with the techniques disclosed herein, the application program 122 can generate a query pertaining to the database 116. The DBMS driver 124 and/or the DBMS software 114 formulate a plan to satisfy the query. In accordance with this plan, the DBMS driver 124 and/or the DBMS software 114 prepare at least one statement that, when executed by the DBMS software 114 in relation to the database 116, satisfy the query and its corresponding plan. Furthermore, the DBMS driver 124 and/or the DBMS software 114 determine that the statement is eligible to be promoted for batch execution, instead of individually for each piece of data relating to the query.

A query is a request for information access from the database 116. A plan, which may also be referred to as a query plan or a query execution plan, includes an ordered series of one or more steps that are executed to satisfy the query. Each step may be or include a statement, which is an operator that the DBMS server 102 performs on or in relation to the database 116. Examples of statements include INSERT, COPY, and UPDATE, which insert data into the database 116, copy data within the database 116, and update data within the database 116, respectively.

A statement is executed in batch form and on a batch basis, as indicated by the reference number 126 in FIG. 1. More specifically, the DBMS client 104 calls a number of times a standard interface, such as a standard API, exposed by the DBMS server 102 to provide batches of data 128A, 128B, . . . , 128N, collectively referred to as the batches of data 128, to the DBMS server 102. That is, each time the DBMS client 104 calls the interface, the client 104 provides a different batch of data 128 to the DBMS server 102.

The DBMS server 102 in response processes the different batches of data 128 provided in accordance with the statement that has been previously prepared. This processing effectuates execution of the statement at the DBMS server 102 on a batch basis, in relation to each different batch of data 128. After processing the batches of data 128, the DBMS server 102 provides feedback 130A, 130B, . . . , 130N, collectively referred to as the feedback 130, back to the DBMS client 104. That is, each time the DBMS server 102 processes a different batch of data 128, the server 102 returns feedback 130 relating to this batch of data 128.

As such, after each time the DBMS client 104 sends the DBMS server 102 a different batch of data 128, the client 104 receives intermediate feedback 130 as to the status of processing the statement prior to the statement being completely processed at the server 102. Stated another way, the DBMS server 102 does not just send feedback 130 after the last batch of data 128N has been sent and processed. Rather, the DBMS server 102 sends feedback 130 after each batch of data 128 is sent and processed.

Because the interface exposed by the DBMS server 102 that the DBMS client 104 calls to provide the batches of data 128 can be a standard API or other interface, the application 122 at the client 104 does not necessarily have to be redeveloped or modified to take advantage of the intermediate feedback capability provided. Processing a statement singly at the DBMS server 102 for each batch of data 128, as opposed to individually for each piece of data within each batch of data 128, may provide performance benefits as well. In some cases, improvements upwards of a factor of fifty may be realized.

As an example of operation of the DBMS 100, an INSERT statement may be prepared in relation to which 1,000 integers within an array are to be inserted into the database 116. The DBMS client 104 may send the integers to the DBMS server 102 for processing in batches 128 of two hundred fifty integers each. Upon receiving each batch of data 128, the DBMS server 102 processes the batch of data 128, and sends feedback 130 to the DBMS client 104. For example, the feedback 130 may indicate whether any of the integers were unable to be inserted into the database 116.

Therefore, the DBMS client 104 receives status updates regarding the processing of each batch 128 of two hundred fifty integers, and not just feedback as to the processing of all four batches 128 just after all 1,000 integers have been processed. The DBMS client 104 does not have to issue any special calls to any special APIs or interfaces of the DBMS server 102 to receive this information. Rather, as each batch of data 128 is processed, the DBMS server 102 automatically returns processing results in the form of feedback 130 to the DBMS client 104.

FIG. 2 shows an example method 200 of the DBMS 100. The method 200 is divided into three columns. Parts of the method 200 in the left column are performed by the application program 122 at the DBMS client 104, and parts of the method 200 in the center column are performed by the DBMS driver 124 at the client 104. Parts of the method 200 in the right column are performed by the DBMS software 114 at the DBMS server 102.

The application program 122 submits a query to access the database 116 (202). In the example method 200, the DBMS driver 124 receives the query and responsively formulates a query plan that, when executed by the DBMS software 114, implements the query (204). As part of this formulation, the DBMS driver 206 can prepare at least one statement for execution by the DBMS software 114 (206). The DBMS driver 206 can determine that the statement is being executed in batch form by the DBMS software 114 (208). In another implementation, the DBMS software 114 can perform parts 204, 206, and 208 instead of the DBMS driver 124, in which case the driver 124 receives the query and passes it to the software 114. In another implementation, part 208 may be performed within the DBMS client 104 while part 204 is performed within the DBMS server 102, or processing at the server 102 may not occur until it has received a batch of data, per part 216.

It is noted that not all statements may be executable in batch form, which is why it may be determined whether the statement that has been prepared in part 206 is capable of being executed in batch form in part 208. Certain types of statements may be capable of being executed in batch form, whereas other types may not be capable of being executed in batch form. For instance, in some DBMSs, INSERT statements can be executed in batch form, but UPDATE statements cannot. The ability to execute a statement in batch form is a property of a particular DBMS, not necessarily a property of the statement itself. For example, some DBMSs might be able to batch process UPDATE statements.

Furthermore, some statements may be capable of being executed in batch form just if certain processing operators are available at the DBMS server 102. If such processing operators are not available, then these statements may not be able to be executed in batch form. Examples of such processing operators may include, for example, streaming forms of UPDATE statements, and streaming forms of INSERT statements, which are COPY statements.

The DBMS driver 124 returns an API, or other interface, that the application program 122 may use to provide data to the DBMS software 114 for effecting the query (210). In the case where the DBMS software 114 performs parts 204, 206, and 208, however, the software 114 may return the API to the application program 122 in part 210, through the DBMS driver 124. The API can be a standard DBMS API. In some implementations, the application program 122 may already know the API, and therefore the API is not returned to the program 122.

The application program 122 calls the API to provide a batch of data to execute the statement that has been prepared (212). The DBMS driver 124 can receive and pass through the API call to the DBMS software 114 (214). The DBMS software 114 responsively processes the batch of data that has been provided in accordance with the statement that has been prepared (216), to effectuate execution of the statement at the DBMS server 102 on a batch basis in relation to the batch of data.

It is noted that implementations of the techniques disclosed herein typically refer to a statement, such as an INSERT statement, that is run across many batches of data, as opposed to running the statement for each batch. This distinction lies in the actions that are performed at the server 102. If a statement is run per batch of data, the server 102 performs more work for each batch, whereas if the statement is run across many batches of data, although some setup processing is performed prior to the first batch and some post-processing is performed after the last batch, in general the server 102 performs less work.

After processing the most recently received batch of data, the DBMS software 114 returns results of this processing to the DBMS driver 124 (218), which receives them (220). The processing results may be in the form of a list of data that is not easily parsed by the application program 122. Therefore, the DBMS driver 124 can suitably populate return values, such as within an array, so that the application program 122 receives the processing results in the expected format (222). The DBMS driver 124 thus reports the return values to the application program (224), which receives them (226).

Parts 214, 216, 218, 220, 222, 224, and/or 226 are repeated one or more times (228), each time with a different batch of data. As such, the application program 122 provides a number of different batches of data to execute the statement at the DBMS server 102. The application program 122 further receives intermediate feedback as to statement execution for each different batch of data, and does not have to wait for all the data to be sent before feedback as to statement execution is received.

At some point, the application program 122 has no additional batches of data to provide to the DBMS server 102. At this stage, the application program 122 may call a different API exposed by the DBMS software 114 at the DBMS server 102 (230). This different API may not be explicitly related to the statement that has been executed at the DBMS server 102, however. For example, the different API may relate to a different query, and/or to new, additional processing that the application program 122 is configured to perform in relation to the database 116.

In the example of FIG. 2, the DBMS driver 124 receives the API call (232). The DBMS driver 124 recognizes that the API call is different than the one that the application program 122 has been calling in repeated performances of part 212 to provide different batches of data to the DBMS server 102. Therefore, by virtue of the application program 122 calling a different API, the DBMS driver 124 interprets the API call of part 230 as the application program 122 signaling that the statement has been finished (234)—i.e., that no further data is to be provided as to the statement.

The DBMS driver 124 thus signals to the DBMS software 114 that the statement has been finished (236), and the software 114 responsively completes execution of the statement (238). In another implementation, the DBMS driver 124 may pass the API call of part 230 through to the DBMS software 114, which then performs part 234. That is, the DBMS software 114 may interpret the API call of part 230 as the DBMS client 104 signaling that the statement has been finished, such that the software 114 then completes statement execution in part 238.

The parts of the method 200 that can be performed by the DBMS driver 124 at the DBMS client 104 can be implemented as a computer program that, when executed at the client 104, implements or effectuates the driver 124. For instance, these parts can be parts 204, 206, 208, 210, 214, 220, 222, 224, 232, 234, and/or 236, as has been described above. The computer program may be stored on a non-transitory computer-readable data storage medium.

Likewise, the parts of the method 200 that can be performed by the DBMS software 114 at the DBMS server 102 can be implemented as a computer program that, when executed at the server 102, implements or effectuates the software 114. For instance, these parts can be parts 204, 206, 208, 210, 216, 218, 232, 234, and/or 238, as has been described above. This computer program may also be stored on a non-transitory computer-readable data storage medium.

We claim:

1. A method comprising:
preparing a statement to be executed in batch form in relation to a database managed by a database management system (DBMS) server for a DBMS client, including determining whether the statement is capable of being executed in batch form in relation to the database; and repeating a plurality of times including a final time and one or more other times prior to the final time,
receiving a call to an interface of the DBMS server from the DBMS client to execute the statement that has been prepared, the DBMS client providing a different batch of data to the DMBS server each time the DBMS client calls the interface;
processing the different batch of data by the DBMS server in accordance with the statement that has been prepared, to effectuate execution of the statement at the DBMS server on a batch basis in relation to the different batch of data, responsive to receiving the different batch of data from the DBMS client via the DBMS client calling the interface; and
after processing the different batch of data, returning results of processing the different batch of data from the DBMS server to the DBMS client, such that the DBMS client receives intermediate feedback as to status of processing the statement prior to the statement being completely processed,
wherein the results of processing for at least one of the other times prior to the final time are returned before the different batch of data is received for the final time.

2. The method of claim 1, wherein the interface of the DBMS server is a first interface of the DBMS server, and the method further comprises:
where the DBMS client has no additional different batches of data to provide to the DBMS server in relation to which execution of the statement is to be effectuated at the DBMS server, receiving a call to a second interface of the DBMS server from the DBMS client, the second interface being different than the first interface;
interpreting the DBMS client calling the second interface, as a different interface than the first interface, as the DBMS client signaling that the statement has been finished; and in response to interpreting the DBMS client calling the second interface as the DBMS client signaling that the statement has been finished, completing the execution of the statement at the DBMS server such that the DBMS server is to process no additional different batches of data in accordance with the statement.

3. The method of claim 2, wherein the second interface does not explicitly relate to signaling that the statement has been finished.

4. The method of claim 1, wherein preparing the statement comprises determining whether the statement is capable of being executed in batch form in relation to the database, based on one or more of:
   a type of the statement, such that certain types of statements are capable of being executed in batch form and other types of statements are not capable of being executed in batch form; and
   available processing operators at the DBMS server, such that the statement is capable of being executed in batch form where one or more certain processing operators are available at the DBMS server.

5. A non-transitory computer-readable data storage medium storing a computer program executable by a database management system (DBMS) client to realize a DBMS driver running on the DBMS client and that performs a method comprising:
   preparing a statement so that the statement is to be executed in batch form in relation to the database managed by the DBMS server, including determining whether the statement is capable of being executed in batch form in relation to the database;
   repeating a plurality of times,
      passing through a call to an interface of a DBMS server managing a database to the DBMS server, the call received from an application running on the DBMS client, the call providing a different batch of data to the DBMS server each time the application calls the interface, the call to execute the statement;
      receiving results of processing the different batch of data from the DBMS server in accordance with the statement that has been prepared, such that the DBMS client receives intermediate feedback as to status of processing the statement prior to the statement being completely processed, the DBMS server processing the different batch of data to effectuate execution of the statement on a batch basis in relation to the different batch of data responsive to receiving the different batch of data; and
      populating return values for the application based on the results, and returning the return values to the application, such that to the application the statement appears to have been singly executed multiple times at the DBMS server for the different batch of data on a non-batch basis and in non-batch form instead of on the batch basis and in batch form and even though the statement has been executed just once at the DBMS server in relation to the different batch of data as a whole.

6. The non-transitory computer-readable data storage medium of claim 5, wherein determining whether the statement is capable of being executed in batch form in relation to the database is based on a type of the statement, such that certain types of statements are capable of being executed in batch form and other types of statements are not capable of being executed in batch form.

7. The non-transitory computer-readable data storage medium of claim 5, wherein the call is a first call, the interface of the DBMS server is a first interface of the DBMS server, and the method further comprises:
   receiving a second call to a second interface of the DBMS server from the application, the second interface being different from the first interface;
   interpreting the application calling the second interface, as a different interface than the first interface, as the application having no additional different batches of data to provide to the DBMS server in relation to which execution of the statement is to be effectuated at the DBMS server;
   in response to interpreting the application calling the second interface as the application having no additional different batches of data to provide to the DBMS server in relation to which the execution of the statement is to be effectuated, signaling to the DBMS server that the statement has been finished, such that the DBMS server completes the execution of the statement and such that the DBMS server is to process no additional different batches of data in accordance with the statement; and
   passing through the second call to the second interface of the DBMS server to the DBMS server.

8. The non-transitory computer-readable data storage medium of claim 7, wherein the second interface does not explicitly relate to signaling that the statement has been finished.

9. The non-transitory computer-readable data storage medium of claim 5, wherein determining whether the statement is capable of being executed in batch form in relation to the database is based on available processing operators at the DBMS server, such that the statement is capable of being executed in batch form where one or more certain processing operators are available at the DBMS server.

10. A database management system (DBMS) server comprising:
   a processor;
   a storage device to store a database of the DBMS; and
   DBMS software managing the database and executable by the processor to prepare a statement so that the statement is to be executed in batch form in relation to the database managed by the DBMS software, and to repeat a plurality of times:
      receive a call to an interface exposed by the DBMS software, the call received from a DBMS client and providing a different batch of data each time, the call to execute the statement;
      process the different batch of data in accordance with the statement that has been prepared, to effectuate execution of the statement on a batch basis in relation to the different batch of data, responsive to receiving the different batch of data from the DBMS client; and
      return results of processing the different batch of data to the DBMS client, such that the DBMS client receives intermediate feedback as to status of processing the statement prior to the statement being completely processed,
   wherein the DBMS software is to prepare the statement by determining whether the statement is capable of being executed in batch form in relation to the database.

11. The DBMS server of claim 10, wherein the DBMS software determines whether the statement is capable of being executed in batch form in relation to the database based on one or more of:
   a type of the statement, such that certain types of statements are capable of being executed in batch form and other types of statements are not capable of being executed in batch form; and available processing operators at the DBMS server, such that the statement is capable of being executed in batch form where one or more certain processing operators are available at the DBMS server.

12. The DBMS server of claim 10, wherein the DBMS software is further executable by the processor to:
receive signaling from the DBMS client that the statement has been finished, such that the DBMS client has no additional different batches of data to provide to the DBMS software in relation to which execution of the statement is to be effectuated by the DBMS software;
in response to receiving the signaling that the statement has been finished, complete the execution of the statement, such that the DBMS software is to process no additional batches of data in accordance with the statement.

13. The DBMS server of claim 12, wherein the call is a first call, the interface exposed by the DBMS software is a first interface exposed by the DBMS software, and the DBMS software is further executable by the processor to:
receive a second call to a second interface exposed by the DBMS software, the second call received from the DBMS client, the second interface different than the first instance,
wherein the second interface does not explicitly relate to signaling that the statement has been finished.

* * * * *